Feb. 7, 1967 H. DE FRANCE 3,303,274

COLOUR TELEVISION TRANSMITTERS FOR SYSTEMS USING AT LEAST ONE FREQUENCY-MODULATED COLOUR-SUBCARRIER

Filed June 18, 1963

INVENTOR.

Henri de France

By Kurt Kelman agent 3,303,274

COLOUR TELEVISION TRANSMITTERS FOR SYSTEMS USING AT LEAST ONE FREQUENCY-MODULATED COLOUR-SUBCARRIER

Henri de France, Levallois-Perret, France, assignor to Compagnie Francaise de Television, a corporation of France Filed June 18, 1963, Ser. No. 293,556
Claims priority, application France, June 18, 1962, 901,090; June 10, 1963, 937,522
3 Claims. (Cl. 178—5.4)

The present invention relates to compatible colour television systems, more particularly of the type using at least one subcarrier which is frequency-modulated by a colour information.

According to the invention, there is provided a colour television transmitter of the type wherein the carrier is modulated by a complex video signal comprising a first wide-band picture signal, which can be used by black and white receivers, and at least one subcarrier, which is frequency-modulated by a colour information, said transmitting comprising means, inserted in the subcarrier channel, for subjecting said subcarrier to an auxiliary amplitude modulation, by a signal which is a function of the colour of the image area which is being scanned, which signal has no information value and is aimed at reducing the visibility, in the image delivered by the receivers, of the spurious structures, due to the modulation of the carrier by said subcarrier.

The invention will be better understood and other characteristics thereof will become apparent by means of the following description and of the appended drawings in which.

Figure 1:
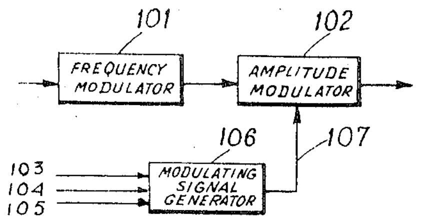
FIG. 1 is the circuit diagram of one method of carrying out the invention.

It is known that in compatible systems, using at least one colour subcarrier, whose spectrum is situated within that of the band occupied by the signal modulating the carrier directly, which signal is used by black-and-white receivers and is preferably the luminance signal, the non-demodulated subcarrier introduces in the black-and-white picture spurious patterns liable to adversely affect the image, this effect being known as "subcarrier visibility."

Besides, a similar effect is observed in colour receivers which also use the signal which modulates the carrier directly, along side with the other signals, since it is impossible to collect entirely the first signal without also collecting the non-demodulated subcarrier.

This problem of subcarrier visibility imposes requirements which collide with those raised by the need of protecting from noise the signal transmitted by the subcarrier. From the former point of view, as low as possible a level of the frequency-modulated subcarrier is desirable, and from the latter point of view as high a level as possible is desirable.

As regards requirements raised by the protection of the colour signal from cross-talk due to the signal which modulates the carrier directly, they are in the same direction as those raised by the protection of the colour signal from noise. This cross-talk is actually only a particular type of noise for the colour signal, while the protection of the luminance signal from cross-talk due to the colour signal is only a more general and more abstract way of presenting the problem of the subcarrier visibility.

In systems using the amplitude modulation of the subcarrier, or of the subcarriers, the amplitude of the subcarrier, once its mean amplitude has been chosen, is imposed by the modulating information signal.

In systems using the frequency modulation of the subcarrier or of the subcarriers, an auxiliary amplitude modulation of that subcarrier as a function of the colour of the explored picture area provides, according to the observations of the applicant, a better solution of the contradictory problems of protection of the colour signal and of subcarrier visibility.

In what follows the case of a single subcarrier will be considered, the solution given in this case being applicable separately to each subcarrier where more than one exist.

The subcarrier under consideration can then be either continuously frequency-modulated—i.e. independently of the picture line transmitted—by a signal of a given colour, i.e. a specific function of the primary colours, or sequentially modulated, for example by two different colour signals alternating at the line frequency.

The level of the modulating signal, and hence the frequency difference of the subcarrier is thus a fixed or a variable function of the colour of the explored object. By frequency difference is meant the difference between the instantaneous frequency of the subcarrier and its resting frequency, corresponding to a zero level of the modulating signal.

Experience has shown that certain colours are more vulnerable by noise than others. For a constant subcarrier amplitude, this constant amplitude has to be sufficiently high to cover the transmission of the most vulnerable colours.

If an amplitude variable with the colour of the explored picture area is used, the protection from noise is more regular and the subjective effect produced by noise is not substantially increased (average noise is higher but more homogeneous), but compatibility (problem of carrier visibility) is much improved. This amplitude modulation can be obtained by means of an amplitude modulator in which the subcarrier is modulated by a modulating signal, which is a function of the colour and is generated by a matrix or more generally a network fed with the primary colour signals or with signals which are a function of these primary colour signals. At the receiver, the corresponding amplitude modulation, as well as any amplitude modulation which may be superimposed upon it, has no effect on the operation of the demodulator, if the latter is, as is usually the case, made insensitive to amplitude modulation, for example by means of a limiter.

FIG. 1 shows the principle of the invention.

A frequency modulator 101, which supplies a wave, unmodulated in amplitude, and includes for this purpose, for example, an output limiter, receives at its input the signal to be transmitted. Its output feeds an amplitude modulator 102 which receives at its modulation input 107 a signal supplied by a network 106 which also receives at its inputs 103, 104 and 105 the primary colour signals supplied by the cameras, and if necessary gamma corrected. It is to be understood that depending on the chosen criterion, some of these inputs may be done away with and that, on the other hand, network 106, as already stated, may be fed with signals already controlled by the primary colour signals.

In the case of one known colour television system, there are transmitted a luminance signal Y which directly modulates the carrier, and a subcarrier which is sequentially modulated in frequency by two different colour signals alternating at the line frequency, these signals being repeated at the receiver to make them simultaneous.

Thus, the modulating signal depends on the colour of the explored picture area, and also upon which of the two signals is being transmitted. This is a further difficulty in avoiding the visibility of the subcarrier. In wide areas of uniform colour, each of the two colour signals takes up a specific level, but the two levels may be distinctly different. The subcarrier visibility results then in a streaky structure which tends to catch the observer's eye.

Figure 2:
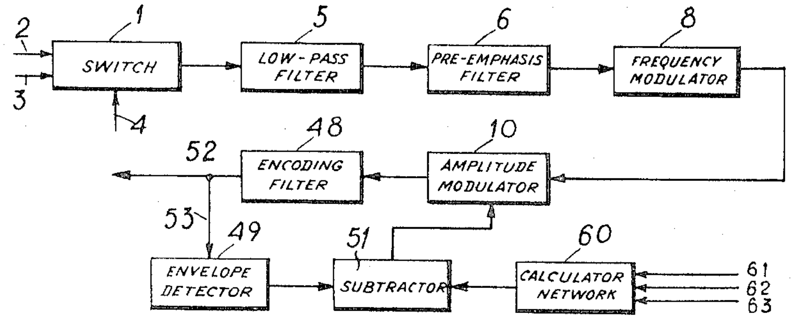
FIG. 2 is the circuit diagram of a transmitter circuit using an auxiliary amplitude modulation which is controlled by a comparison signal.

FIG. 2 shows an embodiment of the invention as applied to the above system.

In this figure a switch 1 has two signal inputs 2 and 3, one control input 4 and one output.

Inputs 2 and 3 receive the two colour signals A1 and A2, obtained in a matrix not shown, from colour signals R (red), B (blue), and G (green), supplied by the cameras and gamma corrected.

Input 4 receives a signal which actuates the switch at the line frequency at least during the active frame periods.

By active frame period is meant the time interval between two frame blanking intervals, the active line period being defined in a similar way as the time interval between two line blanking intervals.

During a part of each frame blanking interval, referred to as a control period, inputs 2 and 3 can receive signals designated as identification signals used for phasing the transmission switch and the reception switch, as shown in the patent application, Serial U.S. No. 270,464, for "Improvements to Colour Television Systems," filed by applicant April 3, 1963.

These identification signals undergo the same transformations at the transmitter and at the receiver as the picture signals A1 and A2 and since they have no effect on the carrier visibility, they will not be referred to further.

Switch 1 feeds a low-pass filter 5 which reduces the bandwidth of the signals propagating through it. Low-pass filter 5 feeds a pre-emphasis filter 6 which attenuates the lower frequencies as compared to the higher frequencies. Pre-emphasis filter 6 is connected to a frequency modulator 8 of the modulated oscillator type, and which may include an output limiter or not.

The output of frequency modulator 8 is coupled to one input of an amplitude modulator 10, whose modulation input is fed as will be explained hereinbelow.

The output of amplitude modulator 10 is connected to the input of a filter 48, which will be designated "encoding filter," whose amplitude versus frequency characteristic shows a minimum for the resting frequency of the subcarrier and increases on both sides thereof. The output of filter 48 is the output 52 of the circuit shown.

Output 52 is coupled to the mixer wherein the subcarrier is added to the luminance signal. It is also connected to the input of an envelope detector 49, whose output is coupled to the first input of a subtractor 51, which may be a differential amplifier.

The second input of subtractor 51 is connected to the output of the calculator network 60, used for generating the signal according to which it is desired to modulate in amplitude the subcarrier, and which, for reasons which will become clear later, is designated "reference signal."

In this figure, calculator 60 is provided with three inputs 61, 62 and 63, as will actually be the case if the reference signal is derived by means of the three primary colour signals. If the reference signal depends only upon the two colour signals which are transmitted sequentially, the number of inputs is then naturally only two.

This circuit is of the general type described in the copending patent application for "Improvement in Colour Television Systems Using at Least One Frequency-Modulated Subcarrier," assigned to the same assignee.

As will be shown, this circuit makes it possible to impress to the subcarrier the desired amplitude modulation, although the subcarrier passes through the encoding filter after it has been amplitude modulated by modulator 10.

It has been shown in the above mentioned copending patent application that:

(a) Protection from noise can be obtained by using in the receiver a filter, designated "decoding filter," which reinforces the central frequencies, i.e., those in the vicinity of the resting frequency, of the subcarrier with respect to its lateral frequencies, even if the subcarrier is not transmitted with an amplitude modulation which is the reverse of that which is imparted by the decoding filter; it has also been shown that such a step does not impair the correct restitution of the modulating signal in the receiver, if the phase distortion imparted to the subcarrier by the decoding filter is corrected; such is the function of the encoding filter 48, which is complementary of the decoding filter used in the receiver;

(b) That the protection thus obtained is considerably improved through a pre-emphasis of the signal to be transmitted, said pre-emphasis being designed to attenuate the lower frequencies of the signal relatively to its higher frequencies;

(c) A further amplitude modulation can be substituted for that resulting from the action of the encoding filter, the effect of this modulation adding to that of the decoding filter without destroying the effect of the latter, in other words having a favourable action on the overall protection from noise according to whether its effect, considered alone, is good or bad in this respect.

In order that the above-mentioned phase correction should be most adequately effected, it is desirable that the input signal of the receiver decoding filter should be the same as the output signal of the transmitter encoding filter. This is the reason why the feedback circuit which has been described is resorted to in order to obtain the desired amplitude modulation of the subcarirer in the present case.

The circuit of FIG. 2 operates as follows:

Switch 1 alternately delivers signals A1 and A2. The latter have their frequency band reduced in the low-pass filter 5. The lower frequencies of the resulting signal are attenuated with respect to its higher frequencies in pre-emphasis filter 6. Frequency modulator 8 delivers the subcarrier alternately modulated by signal A1, during one active interval and by signal A2 during the next active interval, the active intervals being the active line durations within the active frame durations, i.e., those intervals during which picture signals, in the strict sense of the term, are transmitted.

This wave is amplitude-modulated by modulator 10, which is of the type not imparting phase distortion. Finally, the output signal of modulator 10 is applied to the encoding filter 48. The output signal of filter 48 is detected by detector 49. The detected signal is compared, in subtractor 51, to the reference signal generated by the calculator network 60, which reference signal corresponds to the desired amplitude modulation of the subcarrier. Subtractor 51 thus delivers an error signal, which is applied to the modulation input of the amplitude modulator 10, so that filter 48 delivers a subcarrier whose amplitude modulation is substantially the same as if the subcarrier, assumed to have initially a constant amplitude, had been directly modulated by the reference signal.

At the same time, it is seen that the described feedback circuit makes it possible to dispense with an output limiter in frequency modulator 8.

It is to be noted that if the subcarrier is to be, in addition, subjected to an amplitude modulation by all or nothing with a view to eliminating it during the whole or part of the blanking intervals, this modulation will be best effected in a separate amplitude modulator, inserted, for example, between output 52 and the mixer wherein the modulated subcarrier is added to the luminance signal.

The structure of calculator 60 depends, of course, upon the amplitude modulation which is desired, during the active intervals, for the subcarrier collected at output 52.

One example of modulation will be given below.

In the specific case, considered by way of example, it will also be assumed that the sequential signals A1 and A2 are two signals respectively proportional to $(R-Y)/0.7$ and to $(B-Y)/0.89$ where $$Y=0.59G+0.30R+0.11B$$

and R, B and G are the primary colour signals supplied by the cameras and then gamma corrected, signals A1 and A2 having, in addition, been subjected to a band reduction in the low-pass filter 5 of FIG. 1.

Figure 3:
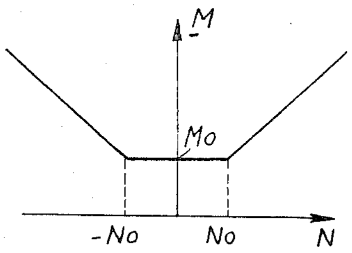
FIG. 3 is a diagram illustrating a method of operation of the circuit of FIG. 2.

FIG. 3 shows the law adopted for the comparison signal. On the abscissa is shown the level N of that of the two signals A1 and A2 whose level is higher in absolute value at a given instant. On this point it should be noted that, as shown in FIG. 2, the sequentially transmitted signals are continuously generated for application to inputs 2 and 3 of switch 1 and become sequential only at the output of this switch. The respective levels of signals A1 and A2 may without any inconvenience be compared before the low-pass filtering. In the contrary case it suffices to place the low-pass filter 5 before switch 1. Signals A1 and A2 are both available during all the active periods. The diagram of FIG. 3 shows in ordinate the level M of the comparison signal proportional to the amplitude desired for the subcarrier as a function of N.

It will be seen that, for N less in absolute value than a threshold value N*o*, level M is constant and equal to a minimum M*o*, and that it grows proportionately to the absolute value of N on either side of the interval $-$N*o* to $+$N*o*.

This law was adopted for the following reasons:

Experience has shown that in the system defined above, substantially homogeneous protection from noise is obtained for the luminance levels, most generally met with, by causing the subcarrier amplitude to grow linearly with N. However, as shown by FIG. 3, this linear variation is no longer preserved but limited at the lower end to a level corresponding to the level M*o* of the comparison signal, for which the subcarrier amplitude is no longer in any way harmful, in so far as compatibility is concerned.

Figures 4, 5:
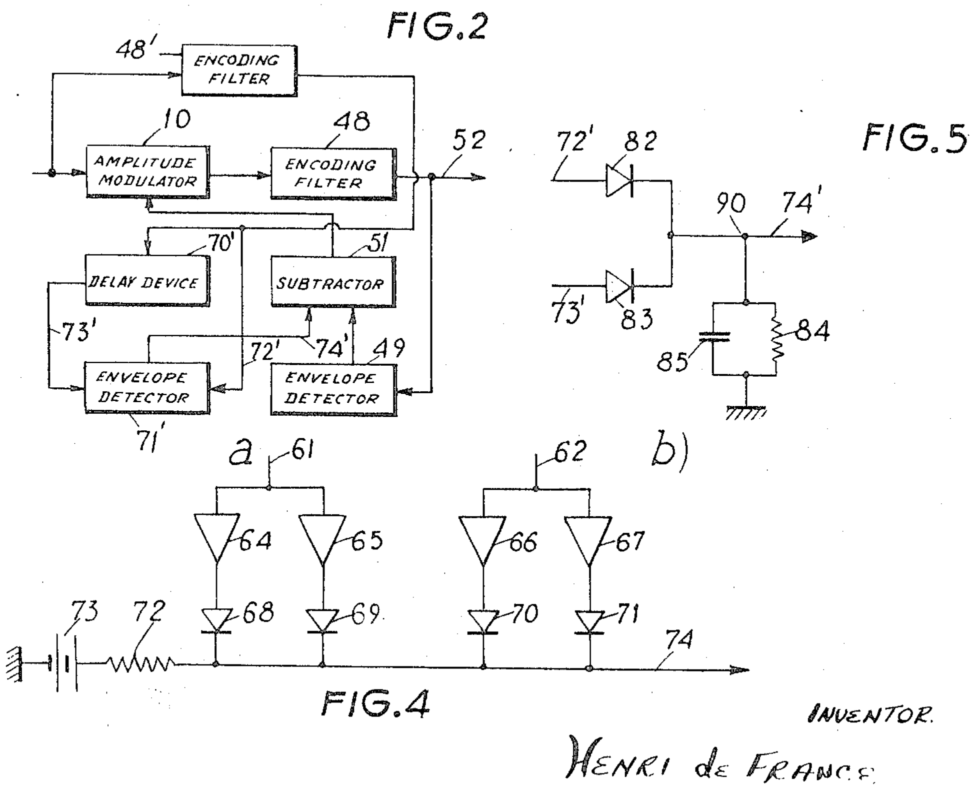
FIG. 4 is the detailed circuit diagram of one component of FIG. 2.
FIG. 5 is a modification of a transmitting circuit according to the invention.

FIG. 4 shows an embodiment of computer 60 in this case. It has only two inputs 61 and 62, which respectively receive signals A1 and A2. Output 61 feeds in parallel two amplifiers 64 and 65, with respective gains $+1$ and $-1$, and input 62 feeds in parallel two amplifiers 66 and 67 with respective gains $+1$ and $-1$. The outputs of the four amplifiers 64 to 67 are respectively connected to the anodes of four diodes 68 to 71, and the cathodes of the four diodes are connected together, their common point being connected, through a resistance 72, to a source of positive bias 73, which delivers a voltage N*o*, and to output 74, which constitutes the calculator output, and is connected to a load of negligible admittance compared to that of resistance 72.

The four diodes and supply 72–73 constitute a device which selectively connects their common output 74 to the anode of the diode which receives the most positive signal, provided its level is higher than N*o*.

If this condition is realized, the voltage which appears at output 74 is then at level N, defined above, and, when this condition is not realized, at level N*o*.

Thus there is collected at the computer output the comparison signal, or a proportional signal, which can be raised to the required level by a linear amplifier.

Subtractor 51 (FIG. 2) supplies at every instant the algebraical difference $M-n$ between M and level $n$ of the subcarrier envelope, and this difference signal is applied to modulator 48 so as to increase or decrease the subcarrier amplitude, depending upon whether it is positive or negative, so obtaining the desired modulation.

Experience shows that under these conditions the result is satisfactory both as regards compatibility and protection from noise.

FIG. 5 illustrates the changes to be made in the transmitter circuit of FIG. 2 with a view to applying to the subcarrier an amplitude modulation according to a different law, the latter being as follows:

A frequency-modulator 8 is used which delivers a constant amplitude frequency-modulated subcarrier, which result can always be obtained through providing the latter with an output limiter.

The frequency-modulated wave delivered by the frequency modulator is applied in parallel, on the one hand, to encoding filter 48 through an amplitude modulator 10, as in the case of FIG. 2, and, on the other hand, to an auxiliary encoding filter 48', identical to filter 48. A comparison is effected between the amplitude of the subcarrier supplied by the auxiliary filter during the picture line being transmitted and during the picture line previously scanned, this comparison being made for corresponding points, i.e. those located on the same vertical of the two lines under consideration; the amplitude of the subcarrier delivered by the first encoding filter 48 is modified by means of amplitude modulator 10, as was the case in the circuit of FIG. 2, but using at every instant as a reference signal one of the two signals which represent respectively the amplitude of the subcarrier, supplied by the auxiliary filter during the line being transmitted and the amplitude modulation of the subcarrier supplied by the auxiliary filter for the corresponding points of the previously scanned line, the signal used as a reference being the one, which is indicative of the stronger amplitude.

As in the case of FIG. 2, the subcarrier supplied by the first encoding filter 48 is used for transmission, the auxiliary filter 48' being used only for the generation of the reference signal.

It should be noted at this point that the difference between the subcarrier amplitudes, for corresponding points on the two lines, after passing through the auxiliary encoding filter, finally arises from the action of the encoding filter, the latter being determined by the spectrum of the signals applied to the encoding filter, hence finally by the difference between the two colour signals. But this difference arises, on the one hand, from the difference between the colours of the corresponding points in the two lines under consideration, and, on the other hand, from the difference in kind between the two colour signals, the latter cause being usually dominant. It is readily verified that under these conditions, the arrangement proposed leads to equalizing for points with the same abscissa (meaning by abscissa the distance between one point of a picture line and the start of that line) the subcarrier amplitude for successively scanned lines, so long as the colour content of these points with the same abscissa shows no variation in the vertical direction, and this through the reinforcement of every alternate line.

This arrangement is especially advantageous from the point of view of compatibility in the most critical areas of the picture, as regards subcarrier visibility, i.e. wide areas of uniform coloration.

FIG. 5*a* shows the circuit starting only from amplitude modulator 10, the components preceding this filter being unchanged from FIG. 2. Frequency modulator 8 feeds in parallel the auxiliary encoding filter 48' and amplitude modulator 10. The output of modulator 10 feeds encoding filter 48, the output 52 of which feeds an envelope detector 49. The output of envelope detector 49, which supplies a signal of level $n$, feeds the first input of a subtractor 51. The output of auxiliary filter 48' feeds the two inputs 72' and 73' of a selective envelope detector 71', the former directly and the latter through a delay device 70' which imposes on its input signals a delay equal to the total duration (inverse of line frequency) of one picture line.

Delay device 70', which may be an ultrasonic line, is of course provided with an amplifying device which compensates for the attenuation arising in the delay line.

Selective envelope detector 71', one embodiment of which is shown in FIG. 5*b*, supplies at its output 74' the detected signal corresponding, at every instant, to the envelope of that one of its input signals which has the greater amplitude.

FIG. 5*b*, which shows the selective detector 71', also shows the two inputs 72' and 73' and output 74' of this device. These inputs are respectively connected to the anodes of diodes 82 and 83, whose cathodes are connected to a common point 90. Point 90 is connected to ground through a detection load consisting of a resistance 84 in parallel with a capacitor 85; point 90 is also connected to output 74' of the device.

The mode of operation is as follows: one only of the two detector circuits respectively consisting of a diode (82 or 83) and the common detection load 84–85, is in a position to function, i.e. that which receives the wave with the higher amplitude, the second being blocked by the detected signal supplied by the former.

There thus appears, under these conditions, at output 74' the envelope signal of the modulated wave with the higher amplitude, and this envelope signal of level M' here forms the comparison signal which takes the place of signal M supplied by calculator 60 in the circuit of FIG. 2. This signal of level M' is applied to the second input of subtractor 51 (FIG. 5*a*); this subtractor, which may be a differential amplifier, supplies at its output the difference signal $M'-n$ applied to amplitude modulator 10 so as to reinforce the subcarrier amplitude if it is positive.

It will be readily seen that the described process leads to the following result: in the portions of the picture where the colour is homogeneous, the subcarrier will have the same amplitude from one line to the next, instead of having alternately two different amplitudes according to which sequential colour signal is being transmitted. The picture is, therefore, considerably improved as concerns the visibility of the subcarrier.

It should be noted that, due to the reduction in the bandwith of signals A1 and A2, inversion of the signal at output 74' (change from the envelope of the direct wave to the envelope of the delayed wave, or conversely) due to a colour change in the horizontal direction, will be neither too frequent nor too close to each other.

A similar remark is applicable to the polarity inversions of the output signal of subtractor 51 in the case of the circuit of FIG. 2.

As in the case of FIG. 2, a separate modulator 42 will be preferably used for eliminating the subcarrier during the whole or part of the blanking intervals.

In the case of FIG. 2, as in the case of FIG. 5, it may be desired to combine with the amplitude modulation as a function of the colour, as here described, an amplitude modulation as a function of the level of that portion of the luminance signal which lies in the same frequency band as the modulated subcarrier. It is then possible to use a single amplitude modulator for the two modulations, the reference signal applied to subtractor 51 then consisting of the sum of the signal M or M' and of the signal depending upon the above mentioned portion of the luminance signal.

The amplitude modulation according to the invention does not necessitate any change in the receivers, as it is eliminated in the limiter preceding the frequency discriminator used for demodulating the subcarrier. It should be noted that in the "SECAM" (registered trade-mark) receivers, where the two sequentially transmitted signals are repeated at the receiver to be made simultaneous the signal may be repeated before demodulation of the subcarrier, and then directed to two different channels corresponding respectively to signals A1 and A2. Each of the two channels then includes a frequency demodulator.

It is to be understood that the invention is not limited to the embodiments described and shown.

In particular the circuits of FIGS. 1 and 2 are applicable both in the case of a subcarrier modulated by a permanent signal and in the case of a subcarrier modulated by a sequential signal. But the law of amplitude modulation will be determined with advantage by taking into account the permanent or sequential character of the colour information transmitted by the subcarrier.

The amplitude modulations of the subcarrier are of course without effect on the signal supplied by the freqency demodulators and reception of a colour transmission in accordance with FIGS. 2 or 5 of the present application can be obtained, for instance, by means of a receiver as described in the above mentioned patent application (FIG. 1*b*).

The arrangements indicated for the subcarrier amplitude are associated with advantage with arrangements of known type concerning its phase, the corresponding measures not modifying, however, the phase of the subcarrier in the course of the active intervals.

In the case of the "SECAM" system, those measures may be of the type described in the patent application, Serial U.S. No. 135,305, filed August 31, 1961, for "Improvements in Colour Television Systems."

What is claimed, is:

1. A colour channel circuit for a colour television transmitter, wherein the colour information is transmitted by means of a subcarrier which is frequency-modulated by a colour information signal which is alternately one or the other of two permanently generated colour signals, the alternation taking place at the line frequency, said colour channel circuit comprising: an amplitude modulator having a first input for receiving said subcarrier frequency-modulated by said colour information signal, a second input and an output; a filter modifying the relative amplitude of the frequency components of the signals applied thereto, said filter having an input coupled to the output of said amplitude modulator and an output; a feedback path coupling the output of said filter to said second input of said amplitude modulator, said feedback path comprising: an envelope detector having an input coupled to the output of said filter and an output, a subtractor having a first input coupled to the output of said envelope detector, a second input, and an output coupled to said second input of said amplitude modulator; means for generating an additional signal whose magnitude depends only upon the magnitudes of both said colour signals; and means for applying said additional signal to said second input of said subtractor for amplitude modulating by said additional signal the subcarrier delivered by said encoding filter.

2. A colour channel circuit for a colour television transmitter, wherein the colour information is transmitted by means of a subcarrier which is frequency-modulated by a colour information signal which is alternately one or the other of two permanently generated colour signals, the alternation taking place at the line frequency, said colour channel circuit comprising: an amplitude modulator having a first input for receiving said subcarrier frequency-modulated by said colour information signal, a second input and an output; a filter modifying the relative amplitude of the frequency components of the signals applied thereto, said filter having an input coupled to the output of said amplitude modulator and an output; a feedback path coupling the output of said filter to said second input of said amplitude modulator, said feedback path comprising an envelope detector having an input coupled to the output of said filter and an output, a subtractor having a first input coupled to the output of said envelope detector, a second input and an output coupled to said second input of said amplitude modulator; means for generating an additional signal whose magnitude increases linearly starting from a minimum threshold value, with the magnitude of that of said two colour signals, which has the greater magnitude at the instant considered; and means for applying said additional signal to said second input of said subtractor for amplitude modulating by said additional signal the subcarrier delivered by said filter.

3. A colour channel circuit for a colour television transmitter, wherein the colour information is transmitted by means of a subcarrier which is frequency-modulated by a colour information signal which is alternately one or the other of two permanently generated colour signals, the alternation taking place at the line frequency, said colour channel circuit comprising: an amplitude modulator having a first input for receiving said subcarrier frequency-modulated by said colour information signal, a second input and an output; a filter modifying the relative amplitude of the frequency components of the signals applied thereto, said filter having an input coupled to the output of said amplitude modulator and an output; a feedback path coupling the output of said filter to said second input of said amplitude modulator, said feedback path comprising an envelope detector having an input coupled to the output of said filter and an output; a subtractor having a first input coupled to the output of said envelope detector, a second input and an output coupled to said second input of said amplitude modulator; an auxiliary filter identical to said first filter and fed in parallel with said amplitude-modulator; a delay device imparting a delay equal to the reciprocal of the line frequency, said delay device having an input connected to said output of said auxiliary filter and an output; and a selective detector having a first input connected to said output of said auxiliary filter, a second input coupled to the output of said delay device, and an output coupled to said second input of said subtractor, said selective detector supplying a detected signal corresponding to that of its input signals which has the higher magnitude.

References Cited by the Examiner

UNITED STATES PATENTS

| | | | |
|---|---|---|---|
| 2,870,248 | 1/1959 | Valeton et al. | 178—5.2 |
| 2,912,492 | 11/1959 | Haantjes et al. | 178—5.2 |

JOHN W. CALDWELL, *Primary Examiner.*

J. H. SCOTT, J. A. O'BRIEN, *Assistant Examiners.*